Nov. 9, 1965    T. F. NAGEY ETAL    3,216,193
SOLID PROPELLANT BURN AREA CONTROL
Filed Dec. 28, 1961
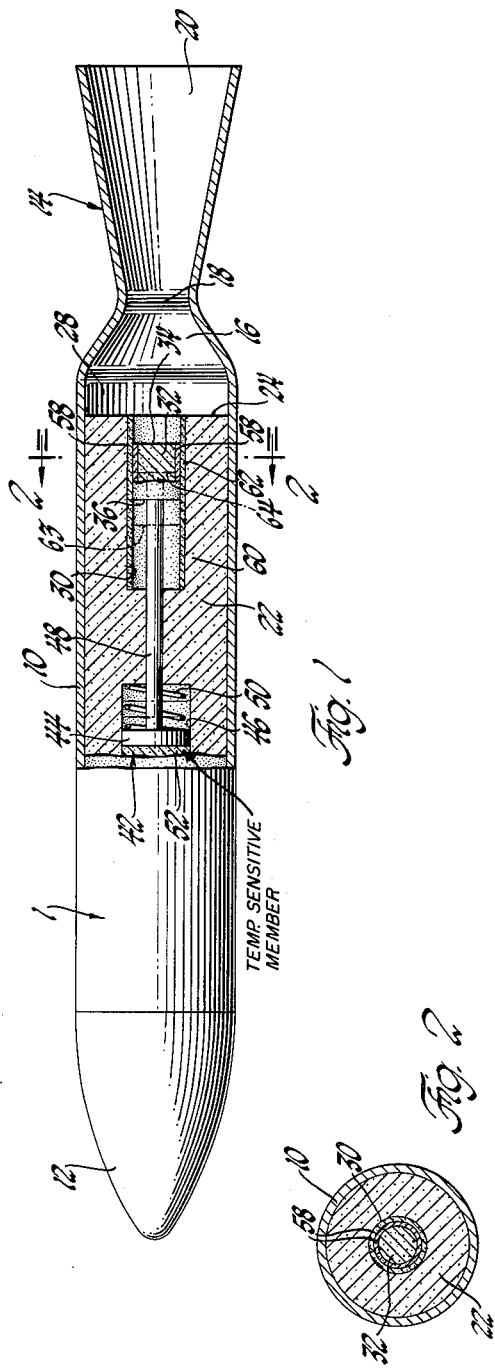
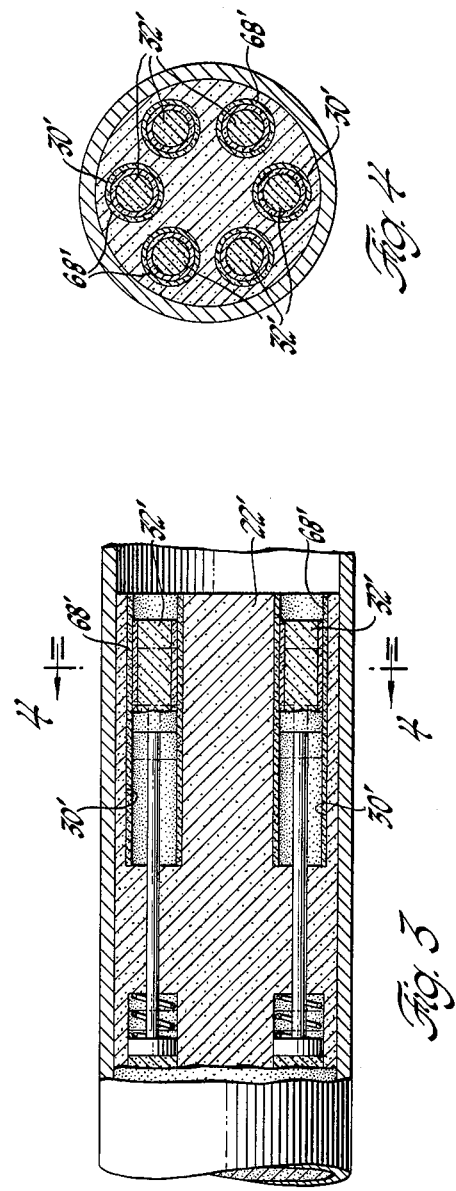
INVENTORS.
Tibor F. Nagey &
BY Albert J. Sobey
Robert E. McCollum
ATTORNEY

United States Patent Office 3,216,193
Patented Nov. 9, 1965

3,216,193
SOLID PROPELLANT BURN AREA CONTROL
Tibor F. Nagey and Albert J. Sobey, both of Indianapolis, Ind., assignors to General Motors Corporation, Detroit, Mich., a corporation of Delaware
Filed Dec. 28, 1961, Ser. No. 162,827
7 Claims. (Cl. 60—35.6)

This invention relates to a solid propellant rocket motor providing a specified thrust at lift-off regardless of the propellant burn rate and ambient temperature conditions under which the rocket motor is stored.

Solid propellant rocket motors have been used quite extensively in recent years as missiles in warfare. Many missiles of this type operate without any particular control systems, depending solely upon the selection of the quantity and burn rate of the propellant, the nozzle throat size and controlled launching conditions for proper functioning. For such use, however, they must be able to operate satisfactorily and in the same manner over extreme variations of ambient temperature. Propellant ambient temperature, however, controls its initial burn rate, which controls the volume of gas generated at ignition for a given burn area. Therefore, most solid propellant missiles obtain their design thrust at lift-off only if the propellant temperature is within a certain range. Missiles that are stored in locations where the ambient temperature is off-design therefore provide either too little thrust at firing or generate an excess of gas effecting an explosion of the missile.

In the past, this difficulty has been overcome to some degree by varying the throat area of the missile exhaust nozzle in accordance with changes in propellant temperature to raise or lower the combustion chamber gas pressure to the proper level. However, this generally involves the use of mechanical or other means inserted in the combustion chamber and/or in the nozzle, which interferes with the exhaust stream and impairs engine operating efficiency.

This invention conditions the missile for lift-off operation at all times prior to firing even though ambient temperature conditions change by varying the initial area of the propellant to be burned in inverse proportion to the change in propellant temperature and burn rate so that the volume flow rate of gas generated at lift-off will always be constant. More specifically, the invention provides a solid propellant grain having a bore extending from its burn surface in which is mounted either a rod of solid propellant or a rod of heat absorbing material, the rod being slidable in response to grain temperture changes to expose more or less of the grain for initial burning.

Therefore, it is an object of the invention to construct a solid propellant rocket motor in a manner to always obtain a constant thrust level upon lift-off.

It is a further object of the invention to construct a solid propellant rocket motor with means to compensate for propellant temperature changes and burn rate prior to firing to always provide a constant combustion chamber pressure upon ignition of the propellant.

It is a still further object of the invention to provide a solid propellant rocket motor construction having means varying the initial burn area of the propellant in proportion to changes in propellant burn rate prior to firing to provide a constant combustion chamber pressure at lift-off.

Other objects, features and advantages of the invention will become apparent upon reference to the succeeding detailed description of the invention and to the drawings illustrating the preferred embodiments thereof, wherein, FIGURE 1 is a side elevational view of a rocket motor embodying the invention, with parts broken away and in section;

FIGURE 2 is a cross sectional view taken on a plane indicated by and viewed in the direction of the arrows 2—2 of FIGURE 1;

FIGURE 3 is an enlarged view of a portion of FIGURE 1 illustrating a modification thereof; and, FIGURE 4 is a cross sectional view taken on a plane indicated by and viewed in the direction of the arrows 4—4 of FIGURE 3.

The figures illustrate the invention in connection with a rocket motor. It will be clear, however, that it would have uses in many installations other than that to be described without departing from the scope of the invention.

FIGURE 1 shows a rocket motor 1 having a hollow longitudinally extending annular casing 10 closed at one end by a cap 12 and formed at its opposite end into an exhaust nozzle 14. The nozzle is a known nonvectoring type having a conical converging inlet 16, a fixed area throat 18 and a conical diverging outlet 20. Casing 10 encloses a cylindrical composite solid propellant charge or grain 22 of a known end burning type consisting of a mixture of a fuel and oxidizer. The grain has an end face 24 constituting its initial burn surface, and is spaced axially from the nozzle inlet 16 to define a combustion chamber 28. The gas evolved by the chemical reaction of the fuel and oxidizer fills and pressurizes chamber 28, and is compressed, accelerated and expanded by the nozzle in a known manner. Further details of the rocket motor per se will not be given since they are known and are immaterial to an understanding of the invention.

The grain 22 may comprise a heterogeneous mixture of oxidizing crystals of perchlorate, for example, in a matrix of an organic plastic-like fuel, such as asphalt, or, other mixtures could be used. It would also include modifying substances to reduce the brittleness and explosiveness, while promoting burning. The grain 22 burns characteristically in a direction perpendicular to its exposed burn surface 24, and initially at a smooth rate varying as a function of its temperature. Burning is initiated by any well known pyrotechnic type igniter, not shown, such as, for example, by igniting explosive squibs buried in the face 24. Other known igniters could be used without departing from the scope of the invention.

As stated previously, the volume of gas generated upon burning of the grain is directly proportional to the grain burn area and its burn rate. Prior to firing, the burn rate is controlled by the grain ambient temperature which may change with changes in storage locations of the missile. Therefore, to assure that the proper quantity of gas will be generated in the combustion chamber at lift-off to produce the design thrust, the burn area should be varied in inverse proportion to the changes in grain temperature.

To this end, the grain 22 is bored along its axis at 30, the bore slidably receiving a rod 32 of solid propellant having flat faces 34 and 36 at opposite ends. The rod is movable in either direction in the bore to expose more or less of the grain bore wall to the combustion chamber. Thus, the initial grain burn surface area is increased by moving the rod into the bore and decreased to a minimum by positioning the rod face 34 flush with face 24. The rod may be of the same propellant as grain 22, although it will be clear that other propellants could be used. The rod 32 also will have ignition means, such as explosive squibs, buried in its face 34.

The rod is moved by a temperature sensitive apparatus indicated generally at 42. It consists of a piston 44 slidably mounted in a bore 46 in the grain, and having a piston rod 48 secured to the end face 36 of rod 32. The propellant rod may be cast around the end of the piston rod, or secured to it by any other suitable method. The piston 44 is movable in opposite directions in bore 46 by a compression spring 50 acting against one side and a temperature sensitive expandable member 52 on the opposite side. Member 52 may consist of a block of paraffin, for example, or any similar known temperature sensitive material adapted to expand or contract in response to temperature changes. It, therefore, reflects ambient temperature changes of the grain 22. A rise in the grain temperature will therefore expand member 52 to move piston 44 and rod 32 towards combustion chamber 28 decreasing the burn area while a drop in grain temperature contracts member 52 permitting spring 50 to move piston 44 and rod 32 in the opposite direction increasing the burn area.

Before describing the overall operation, it should be noted that both the bore 30 of the grain 22 and the outer periphery of the rod 32 are coated with a low melting point inhibitor 58 to prevent the spreading of the flame in the combustion chamber past the end face 34 of the rod. This inhibitor 58 would be made of a thin material with a low melting temperature and low thermal conductivity. The inhibitor is therefore essentially a heat barrier to maintain part 60 of the grain that surrounds the rod but is not exposed to the combustion chamber below its ignition temperature. If such an inhibitor were not provided, the grain would burn along the entire length of its bore, thus destroying the effectiveness of rod 32 and greatly increasing the chamber pressure. The inhibitor may be of any known type which does not sustain combustion in itself, and may consist of essentially the same elements as the solid propellant without the oxidizer, for example. Upon burning of the grain, therefore, the inhibitor exposed to the combustion chamber merely melts and is dissipated into the gas in the chamber.

The rocket motor is initially assembled under propellant design ambient temperature conditions so as to fix the grain initial burn rate. The rod 32 is initially positioned in bore 30 of grain 22 as shown in solid lines in FIGURE 1 withdrawn from its face 24, and piston 44 is in its median position. The grain 22 is then inserted in the casing 10 through its cap end, and the cap 12 is secured to the casing by suitable means not shown. The propellant initial burn area is therefore defined by the area of face 24, the area of face 34 of rod 32, and the area of that portion of the grain bore 30 between the faces 34 and 24. If the grain were ignited at this time, that portion 62 of the inhibitor that is exposed to the combustion chamber would melt, and the total grain burn surface areas just described would then burn at the design rate so that the reaction of the fuel and oxidizer would produce a gas pressure in chamber 28 equal to the design pressure. The gases would then be discharged from the nozzle imparting the design thrust to the rocket motor to launch it in the proper manner.

If the missile is moved to a location where the grain ambient temperature is lower than design, then as the temperature drops, the grain burn rate will also drop. Simultaneously, however, member 52 will contract permitting spring 50 to move piston 44 and rod 32 further into bore 30 away from the grain face 24, as shown by dotted lines 63. Thus, the burn surface area is increased in proportion to the lowered burn rate, and the same volume of gas would be generated upon ignition of the grain as under the prior operation. Conversely, if the grain ambient temperature is higher than design, then rod 32 will be moved towards the combustion chamber as shown by dotted lines 64 decreasing the total initial burn area in inverse proportion to the increased burn rate so that the volume of gas generated upon ignition remains constant.

It should be noted that the length and diameter of the rod 32 are relatively small in comparison to that of grain 22, being on the order of say 40 to 1, for example, so that when the grain and rod are consumed, the propellant in rod 32 will not play any significant part in contributing or detracting from the thrust. Once the grain has been ignited, therefore, the inhibitor lining the exposed portion of the grain bore is melted, and the grain burns over the initial fixed area regressively consuming both the grain 22 and rod 32. The entire propellant rod is consumed in a matter of seconds, for example, and, therefore, it is relatively immaterial whether the rod 32 is pushed in one direction or the other during this time since the missile by now is well on its scheduled flight path and miniscule changes in burning have very little effect on the overall thrust produced. The invention is for conditioning the rocket for design operation at firing, rather than to control its operation afterwards, since other variables, which will not be discussed here, then take over control of burning of the grain.

Therefore, it will be seen that the rocket missiles may be stored in any location regardless of the temperature conditions since, at firing, a combustion chamber gas pressure providing the design thrust is always obtained.

While FIGURE 1 shows the rod 32 as consisting of a solid propellant, it could be formed from a heat insulating material such as tungsten or carbon, for example. In this case, it would act not only as a burn area varying rod, but also as a heat barrier to keep that portion of the grain bore not exposed to the combustion chamber below its ignition point. The rod would otherwise behave and operate in the same manner as the solid propellant rod, and therefore, further details in connection with the modification will not be given.

FIGURES 3 and 4 show use of six propellant rods 32′ instead of one as shown in FIGURE 1, each being slidably received in bores 30′ symmetrically arranged about the axis of the propellant grain 22′. Each of the bores and rods is lined with an inhibitor 68′ and constructed in a manner similar to that of the single rod and bore shown in FIGURE 1, and each operates in a similar manner, that is, being slidably moved in the bores in response to grain ambient temperature changes. The FIGURES 3 and 4 construction, however, affords greater control over the burn area than the design shown in FIGURES 1 and 2 since the individual rods 32′ are each sensitive to local fluctuations in grain ambient temperature, and therefore can increase or decrease grain surface exposure locally as required whenever local grain ambient temperatures vary from the design.

While the grain has been illustrated as being cylindrical in shape, it will be clear that other grain shapes could be used, and that other type nozzles, such as swivel or vectoring nozzles, for example, could be used without departing from the scope of the invention.

While the invention has been illustrated in connection with a missile type rocket motor, it will be clear to those skilled in the art to which the invention pertains that it would have uses in many jet reaction motor type installations other than that illustrated, and that many changes and modifications may be made thereto without departing from the scope of the invention.

We claim:

1. A solid propellant fluid jet reaction motor comprising a hollow casing formed with a fluid jet exhaust nozzle at one end, said casing containing a solid propellant grain spaced from said nozzle to define a combustion chamber between, said grain burning regressively from its surface exposed to the combustion chamber producing a fluid under pressure in said chamber, the burn rate of said grain and the chamber pressure varying with changes in grain temperature, and means to compensate for changes in grain temperature to produce a predetermined chamber pressure immediately after ignition of said grain surface, said means comprising temperature responsive means movable in response to changes in grain temperature to vary the burn area of said grain surface.

2. A solid propellant fluid jet reaction motor comprising a hollow casing formed with a fluid jet exhaust nozzle at one end and containing a solid propellant grain spaced from said nozzle to define a combustion chamber between, said grain burning regressively from its surface exposed to the combustion chamber producing a gas under pressure in said chamber, the burn rate of said grain and the chamber pressure varying with changes in grain temperature, and means to compensate for changes in grain temperature to produce a predetermined chamber pressure immediately after ignition of said grain, said means comprising temperature responsive means slidably mounted within said grain and movable in response to changes in grain temperature to vary the burn area of said grain surface.

3. A solid propellant fluid jet reaction motor comprising a hollow casing formed with a fluid jet exhaust nozzle at one end and containing a solid propellant grain spaced from said nozzle to define a combustion chamber between, the burning of said grain producing a fluid under pressure in said chamber, the burn rate of said grain and the chamber pressure varying with changes in grain temperature, said grain having a portion exposed to the chamber constituting the initial burn area of said grain and having a bore therein extending from said portion, burn area varying means slidably contained in said bore having a portion at times flush with said portion to define a minimum propellant burn area and being movable to a position within said grain to expose more grain to said combustion chamber changing the initial burn area of said portion, and means to slide said burn area varying means in response to grain temperature changes to vary the burn area and produce a predetermined chamber pressure immediately after ignition of said grain.

4. A solid propellant fluid jet reaction motor comprising a hollow casing formed with a fluid jet exhaust nozzle at one end and containing a solid propellant grain spaced from said nozzle to define a combustion chamber between, the burning of said grain producing a fluid under pressure in said chamber, the burn rate of said grain and the chamber pressure varying with changes in grain temperature, said grain having a portion exposed to the chamber constituting the initial burn area of said grain and having a plurality of bores therein extending from said portion, burn area varying means slidably contained in each of said bores each having a portion at times flush with said portion to define a minimum propellant burn area and each being movable to a position within said grain to expose more grain to said combustion chamber changing the initial burn area of said portion, and means to slide said burn area varying means in response to grain temperature changes to vary the burn area and produce a predetermined chamber pressure immediately after ignition of said grain.

5. A solid propellant fluid jet reaction motor comprising a hollow casing formed with a fluid jet exhaust nozzle at one end and containing a solid propellant grain spaced from said nozzle to define a combustion chamber between, the burning of said grain producing a fluid under pressure in said chamber, the burn rate of said grain and the chamber pressure varying with changes in grain temperature, said grain having a portion exposed to the chamber constituting the initial burn area of said grain and having a bore therein extending from said portion, burn area varying means slidably contained in said bore having a portion at times flush with said portion to define a minimum propellant burn area and being movable to a position within said grain to expose more grain to said combustion chamber changing the initial burn area of said portion, and means to slide said burn area varying means in response to grain temperature changes to vary the burn area and produce a predetermined chamber pressure immediately after ignition of said grain, said burn area varying means comprising a rod of solid propellant, and low melting temperature means lining the bore of said grain to retard the burning of the portion of said grain surrounding said rod and not exposed to the combustion chamber.

6. A solid propellant fluid jet reaction motor comprising a hollow casing formed with a fluid jet exhaust nozzle at one end and containing a solid propellant grain spaced from said nozzle to define a combustion chamber between, the burning of said grain producing a fluid under pressure in said chamber, the burn rate of said grain and the chamber pressure varying with changes in grain temperature, said grain having a portion exposed to the chamber constituting the initial burn area of said grain and having a bore therein extending from said face containing a second solid propellant, said second propellant being slidably contained in said bore and having a portion at times flush with said grain portion to define a minimum propellant initial burn area and being movable to a position in said bore to expose a larger area of said grain changing the total initial burn area, and means to slide said second propellant in response to grain temperature changes to vary the burn area and produce a predetermined chamber pressure immediately after ignition of said propellants.

7. A solid propellant fluid jet reaction motor comprising a hollow casing formed with a fluid jet exhaust nozzle at one end and containing a solid propellant grain spaced from said nozzle to define a combustion chamber between, the burning of said grain producing a fluid under pressure in said chamber, the burn rate of said grain and the chamber pressure varying with changes in grain temperature, said grain having a face constituting the initial burn area of said grain and having a bore therein extending from said face, heat barrier means slidably contained in said bore having an end portion at times flush with said face to define a minimum propellant burn area and being movable to a position exposing a greater area of said grain for burning upon ignition of said grain, and means to slide said heat barrier means in response to grain temperature changes to produce a predetermined combustion chamber pressure immediately after ignition of said grain.

References Cited by the Examiner
UNITED STATES PATENTS 2,956,401 10/60 Kane _____ 60—39.47
3,066,486 12/62 Kirshner et al. _____ 60—39.47

SAMUEL LEVINE, *Primary Examiner.*